(12) United States Patent
Aoki

(10) Patent No.: US 6,512,222 B2
(45) Date of Patent: Jan. 28, 2003

(54) DISPLACEMENT MEASURING APPARATUS

(75) Inventor: Toshihiko Aoki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 7 days.

(21) Appl. No.: 09/769,258

(22) Filed: Jan. 26, 2001

(65) Prior Publication Data

US 2001/0011699 A1 Aug. 9, 2001

(30) Foreign Application Priority Data

Feb. 3, 2000 (JP) ......................................... 2000-026301

(51) Int. Cl.⁷ .................................................. G01D 5/34
(52) U.S. Cl. ............................. 250/231.13; 250/237 G; 356/399
(58) Field of Search ..................... 250/231.13, 231.14, 250/237 G, 231.16, 208.1; 356/399–401, 389, 395; 341/4, 6–11, 13, 15, 31

(56) References Cited

U.S. PATENT DOCUMENTS

| | | | | |
|---|---|---|---|---|
| 4,499,374 A | | 2/1985 | Kabaya | |
| 5,115,239 A | * | 5/1992 | Ushiyama | ..................... 341/15 |
| 5,155,355 A | | 10/1992 | Kabaya | |
| 5,302,820 A | * | 4/1994 | Henshaw et al. | ...... 250/231.16 |
| 5,539,519 A | * | 7/1996 | Takagi et al. | ................ 356/499 |
| 5,576,537 A | * | 11/1996 | Holzapfel et al. | ...... 250/237 G |
| 5,886,352 A | * | 3/1999 | Wright et al. | .......... 250/231.14 |

* cited by examiner

Primary Examiner—Kevin Pyo
Assistant Examiner—Seung C. Sohn
(74) Attorney, Agent, or Firm—Oliff & Berridge, PLC

(57) ABSTRACT

The scale, of a displacement measuring apparatus, has an optical grating with a pitch $\lambda$. The light detectors of the light detector array have a plurality of the stripe-patterned portions arranged at a pitch equal to $\lambda$ and a connecting portion interconnecting the stripe-patterned portions.

13 Claims, 13 Drawing Sheets ized pitch. As a
result of such miniaturization, contamination, etching
residue, and the like disposed on the space between the light
detectors result in such an accident as to short-circuit the
light detectors, or increase leakage current. These short-
circuit and the leakage current reduce the reliability and
through-put of the encoder. In addition, when the width of
the light detector is miniaturized, signal wire contact may be
defective. This also results in reducing the reliability of the
encoder.

DISPLACEMENT MEASURING APPARATUS

BACKGROUND OF THE INVENTION

1. Field of the Invention

The present invention relates to a displacement measuring apparatus comprising a scale and a receiving device array which are disposed so as to be relatively movable and output displacement signals.

2. Description of the Related Art

In the prior art, it is known to compose an optical encoder which has a light detector array serving as an index grating. For example, in such a case that 4-phases displacement signals are to be output, the light detector array may be composed of a plurality of light detectors arranged at a pitch of $3\lambda/4$ (where, $\lambda$ is a scale grating pitch). In this case, the respective light detectors in the same phase are connected in parallel with each other, whereby 4-phases signals of A, BB, B and AB can be output.

To produce an optical encoder with a miniaturized scale pitch, it is necessary to form a light detector array on which light detectors are arranged with a miniatur

SUMMARY OF THE INVENTION

An object of the present invention is, considering the above-described situation, to provide a displacement measuring apparatus which has a high reliability and a high through-put.

The displacement measuring apparatus according to the present invention comprises: a scale on which an scale grating is formed along a measurement axis to have a grating pitch of $\lambda$; and a receiving device array disposed against the scale to be relatively movable along the measurement axis, which detect the scale grating to output a plurality of displacement signals having different phases from each other, wherein the receiving device array comprises, a substrate; and a plurality of receiving devices having a plurality of stripe-patterned portions and connecting portions interconnecting the stripe-patterned portions to output a plurality of displacement signals having different phases from each other, the stripe-patterned portions being arranged along the measurement axis at a pitch equal to $n\lambda$ (where, n is a positive integer).

In the present invention, one receiving device is composed of a plurality of stripe-patterned portions having the same pitch as the scale or integer times of that, and connecting portions interconnecting the stripe-patterned portions. In other words, one receiving device is composed by combining a plurality of the same phase receiving devices into one detector.

According to the above-described constitution, even if contamination, etching remnant, and the like are disposed on the space between the neighboring stripe-patterned portions in a receiving device, it does not result in such an accident as to short-circuit the receiving devices, or increase leakage current because the stripe patterned portions in the receiving device have the same phase. Therefore, the displacement signal outputs are not affected with such contamination and the like. As a result, a high reliability and a high through-put can be obtained for a miniaturized encoder.

The present invention can be, for example, applied to an optical encoder. In this case, the scale grating is an optical grating, and the receiving device array is a light detector array on which a plurality of light detectors are formed to serve as the receiving devices. Each of the light detectors has a light detecting surface continuing from the stripe patterned portions to the connecting portion, and the connecting portion serves as a signal wire contact portion. As a result, even if the width of the stripe patterned portion is narrow, the signal wire can be reliably made contact with the light detector.

In the optical encoder, the plurality of the light detectors are arranged along the measurement axis at a pitch equal to $\{n+(2M-1)/2\}\lambda$ (where, n and M are positive integers, respectively) such that each set of two light detectors output dual-phase displacement signals with reverse phases each other. Alternatively, the plurality of the light detectors are arranged along the measurement axis at a pitch equal to $\{n+(2M-1)/4\}\lambda$ (where, n and M are positive integers, respectively) such that each set of four photo-detectors output four-phase displacement signals that are 90° phase-shifted from each other. Further, the plurality of the light detectors can are arranged along the measurement axis at a pitch equal to $(n+N/3)\lambda$ (where, n is a positive integer, and N is a positive integer except multiple of 3) such that each set of three photo-detectors output three-phase displacement signals that are 120° phase-shifted from each other.

Further, in the present invention, the connecting portion (s) can be disposed such as to, (a) interconnect between each of the midpoints of the stripe-patterned portions, (b) interconnect between each of at least one end point of the stripe-patterned portions, or (c) interconnect between the stripe-patterned portions at a plurality points of each of the stripe-patterned portions.

The present invention can also be applied to a magnetic encoder and a capacitance-type encoder. In the former case, the scale grating is a magnetic grating which generate a periodic magnetic field with a pitch of $\lambda$, and the receiving device array is a magnetic detector array on which a plurality of magnetic detectors are formed to serve as the receiving devices. In the latter case, the scale grating is a transferring electrode array which has a plurality of transferring electrodes arranged at the pitch of $\lambda$, and the sensor head has a transmitting electrode and a receiving electrode array serving as the receiving device array, both of which are capacitively coupled to the transferring electrode array, the receiving electrode array having a plurality of receiving electrodes which serve as the receiving devices.

DETAILED DESCRIPTION OF THE PREFERRED EMBODIMENTS

Figure 1:
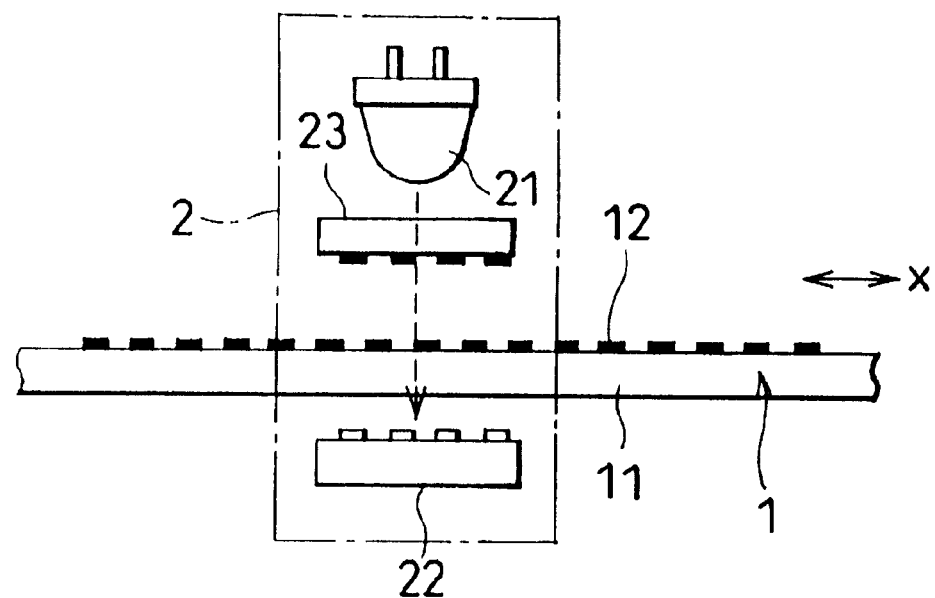
FIG. 1 shows an optical encoder embodying of the present invention.
Figure 2:
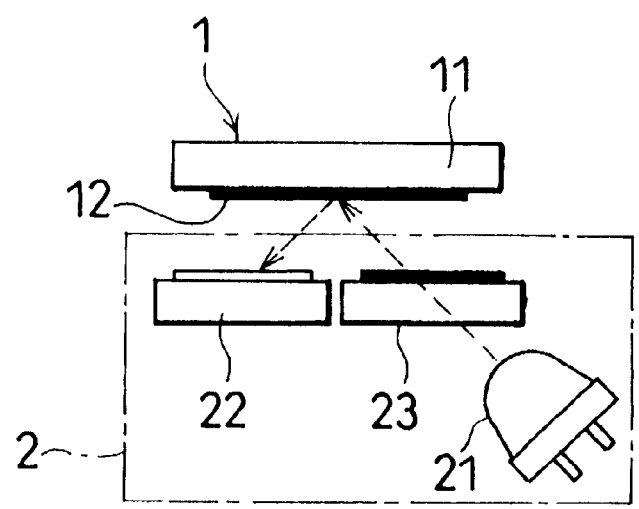
FIG. 2 shows another optical encoder embodying of the present invention.

FIG. 1 and FIG. 2 show basic structures of optical encoders to which the present invention is applied. Each of the optical encoders has a scale 1 and a sensor head 2. The sensor head 2 is disposed against the scale 1 to be relatively movable along a measurement axis x of the scale 1, and output displacement signals. The encoders of FIGS. 1 and 2 are transmission-type and reflection-type respectively. In FIG. 1, the scale 1 has a transparent substrate 11 on which a transmission-type optical grating 12 is formed by arranging transmitting portions and non-transmitting portions along the measurement axis x. In FIG. 2, the scale 1 has a substrate 11 on which a reflection-type optical grating 12 by arranging reflecting portions and non-reflecting portions along the measurement axis x.

The sensor head 2 includes a light source 21 such as an LED, an index grating 23 and a light detector array 22 receiving light from the scale 1. The light detector array 22 has a plurality of light detectors arranged along the measurement axis x at a predetermined pitch in relation to the scale pitch so as to output plural phase displacement signals.

Embodying Mode 1

Figure 3:
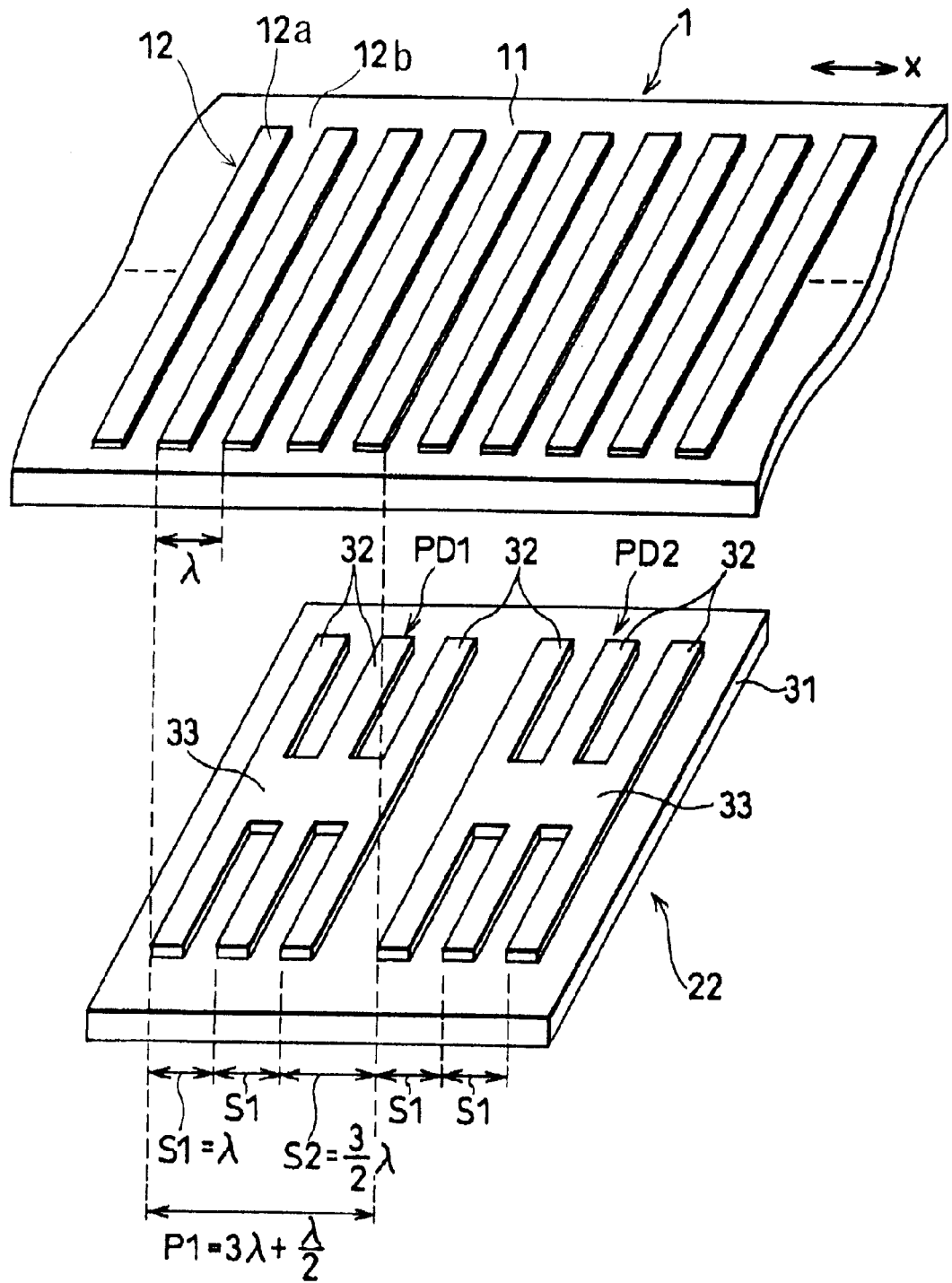
FIG. 3 shows a perspective view of a scale and a light detector array according to an embodiment.

FIG. 3 shows a relationship between the scale 1 and the light detector array 22, which can be applied to both types of FIGS. 1 and 2. The optical grating 12 on the scale 1 has transmitting portions (or reflecting portions) 12a and non-transmitting portions (or non-reflecting portions) 12b alternately arranged along the measurement axis x at the pitch of $\lambda$. The light detector array 22 comprises a substrate 31 and two light detectors PD1 and PD2 formed thereon. Each of the light detectors PD1 and PD2 has three stripe-patterned portions 32 and a connecting portion 33 interconnecting the stripe-patterned portions 32. The stripe-patterned portions 32 are arranged along the measurement axis x at the same pitch, $S1=\lambda$, as the scale pitch.

The relative position relationship between the light detector PD1 and PD2 is determined in such a manner that when the stripe-patterned portion 32 of the light detector PD1 is overlapped to the transmitting portion (or reflecting portion) of the scale 1, the stripe-patterned portion 32 of the light detector PD2 is overlapped to the non-transmitting portion (or non-reflecting portion) of the scale 1. In order to satisfy such a condition, the light detectors PD1 and PD2 are arranged at a pitch of $P1=3\lambda+\lambda/2$, thereby outputting A- and B-phase displacement output signals that are reverse phases each other.

Although only one set of two light detectors PD1 and PD2 is shown in FIG. 3, plural sets may be arranged in general. Similar to this, although the light detectors PD1 and PD2 has three stripe-patterned portions 32 in FIG. 3, the light detector may generally have two or more stripe-patterned portions. The pitch of the stripe-patterned portions 32 can be generally set to $S1=n\lambda$ (where, n is a positive integer). In FIG. 3, although the space S2 between the neighboring stripe-patterned portions 32 of the light detectors PD1 and PD1 is set to $3\lambda/2$, it may be generally set to $\{(2M-1)/2\}\lambda$ (where, M is a positive integer) in such a condition as to secure a sufficient space width and obtain the reverse phase outputs.

As above described, in general, the pitch P1 of the light detectors PD1 and PD2 may be set to $P1=\{n+(2M-1)/2\}\lambda$ (where, n and M are positive integers, respectively)

Figure 4A:
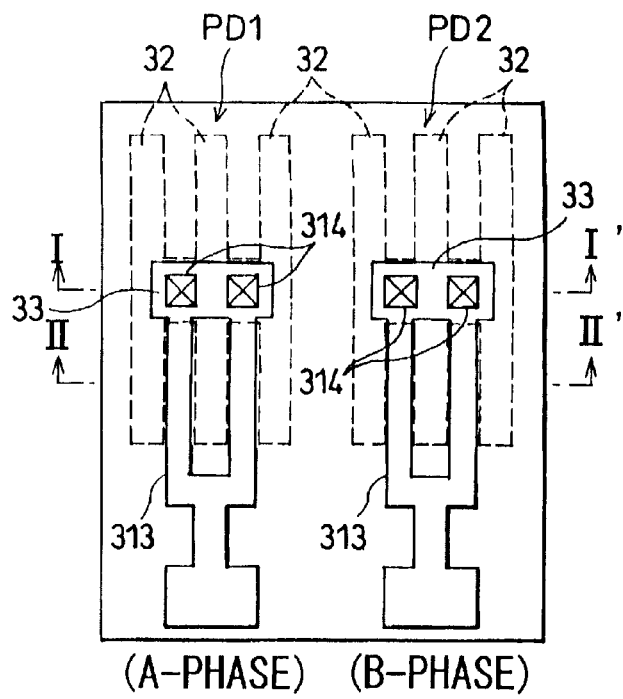
FIGS. 4A to 4C show a structure of the light detector array.
Figure 4B:
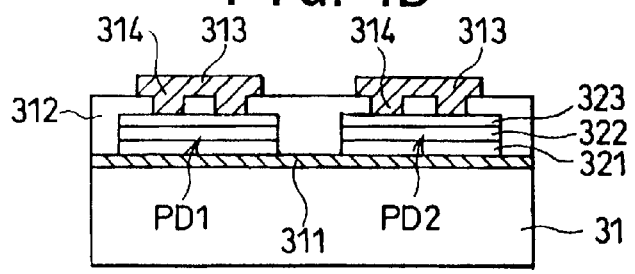
Figure 4C:
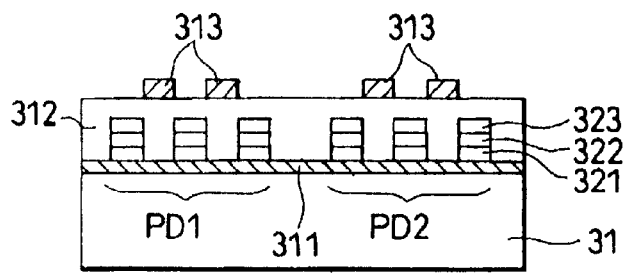

In FIG. 3, signal terminal wires, which should be made contact to the light detectors PD1 and PD2, are not shown. FIGS. 4A to 4C show the light detectors PD1 and PD2 including the signal wires in detail. FIG. 4A is a plan view of the light detectors PD1 and PD2. FIGS. 4B and 4C are cross section at I–I' and II–II' lines of FIG. 4A, respectively.

The light detectors PD1 and PD2 are photodiodes which comprise p-type, i-type and n-type amorphous Si layer 321, 322 and 323 sequentially deposited and patterned on the substrate 31 such as glass. The photodiode has a light detecting surface which is continuously formed from the stripe-patterned portions 32 to the connecting portion 33 interconnecting the midpoints of the stripe-patterned portions 32. On the substrate 31, a common electrode 311 is previously formed. The light detectors PD1 and PD2 are covered by an insulating film 312 such as CVD SiO2. Signal wires 313 are formed on the insulating film 312 to make contact to the light detectors PD1 and PD2 via through-holes 314 formed in the insulating film 312. In this case, the through-hole 314 is formed at the connecting portions 33.

As described above, in this embodying mode, one light detector is formed by integrally combining a plurality of the same phase light detectors in the conventional encoder. In this case, even if there are contamination or etching remains between the stripe-patterned portion in the light detector, it is not affected to the output signal. In this embodying mode, if contamination and the like is deposited on the space of the light detectors PD1 and PD2, it may result in trouble. However, such the space is only one in one set of the light detectors. Further, in FIG. 3, the space between the light detectors PD1 and PD2 is set to A, larger than the space, $\lambda/2$, between the stripe-patterned portions in the light detector.

Therefore, according to the above-described embodying mode, even if the scale pitch $\lambda$ is miniaturized, the reduction of reliability and through-put due to contamination and the like can be prevented. Crosstalk noises between the different phase output signals can also be suppressed. In addition, since the wire contact is made at the connecting portions, low contact resistance can be obtained in such a case that the scale pitch $\lambda$ is more miniaturized.

Embodying Mode 2

Figure 5A:
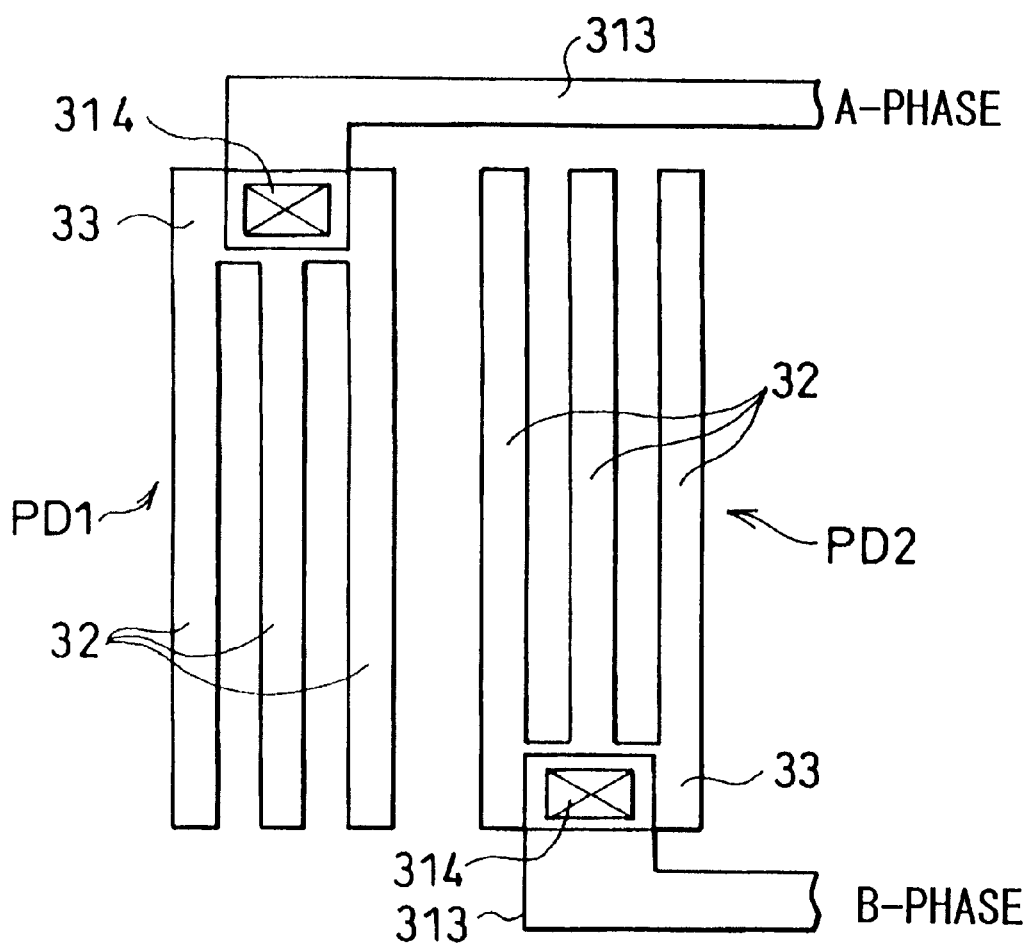
FIGS. 5A and 5B show layouts of a light detector array according to another embodiment.

FIG. 5A shows a layout of the light detectors PD1 and PD2 according to another embodying mode. It should be appreciated that the same portions as in the above-mentioned embodying mode is denoted by the same numbers in order to omit the detail description for the corresponding portions. The size of each portions of the light detectors PD1 and PD2 is the same as the above-mentioned embodying mode. In this embodying mode, the connecting portions 33 interconnects one end point of each the stripe-patterned portions 32, and the signal wires 313 are made contact at the connecting portions 33.

In this embodying mode, the output signal may be more delayed in comparison with the above-mentioned embodying mode. However, since the restrictions on the wire width can be relaxed, it becomes easy to produce the device.

Figure 5B:
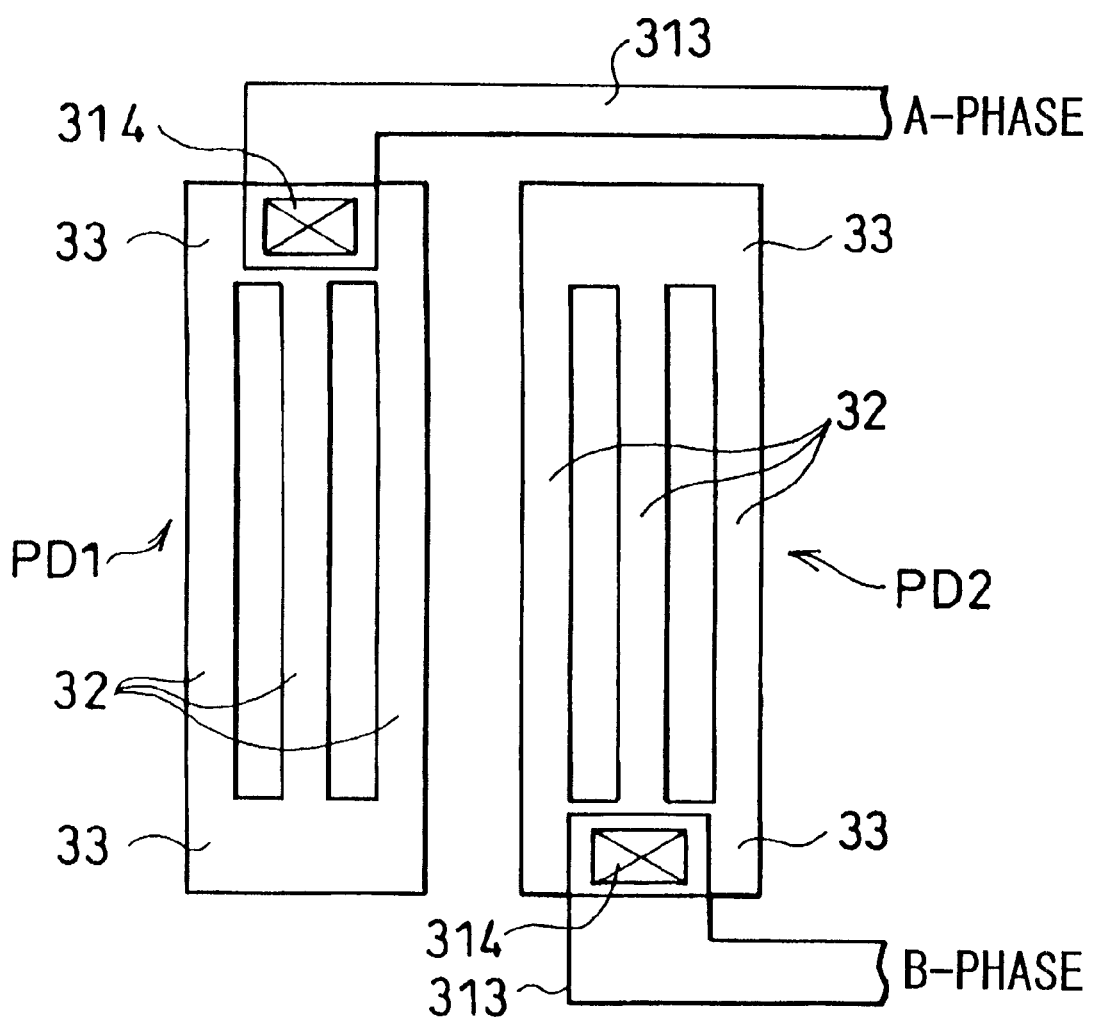

FIG. 5B shows another layout of the light detectors PD1 and PD2 according to the embodying mode. In this layout, the connecting portions 33 are disposed at both end points of each the stripe-patterned portions 32.

Embodying Mode 3

Figure 6A:
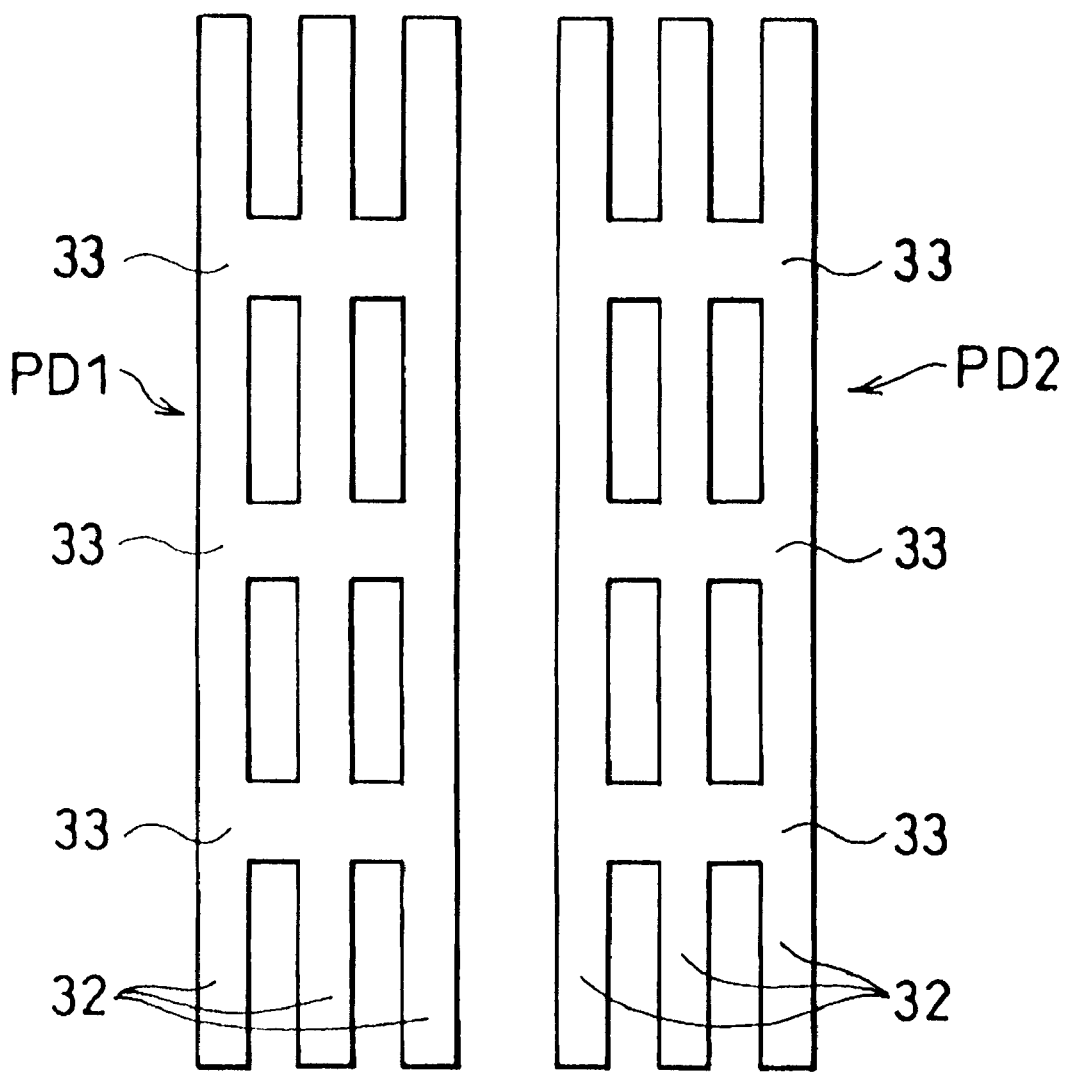
FIGS. 6A and 6B show layouts of a light detector array according to another embodiment.

FIG. 6A shows a layout of the light detectors PD1 and PD2 according to another embodying mode. It should also be appreciated that the same portions as shown in the above-mentioned embodying modes is denoted by the same numbers in order to omit the detail description for the corresponding portions. The size of each portions of the light detectors PD1 and PD2 is also the same as the above-mentioned embodying modes. In this embodying mode, the connecting portions 33 interconnecting the stripe-patterned portions 32 are disposed at plural positions in the stripe-patterned portions 32, and serve as wire contact positions.

According to this embodying mode, the signal delay in the light detectors PD1 and PD2 can be reduced.

Figure 6B:
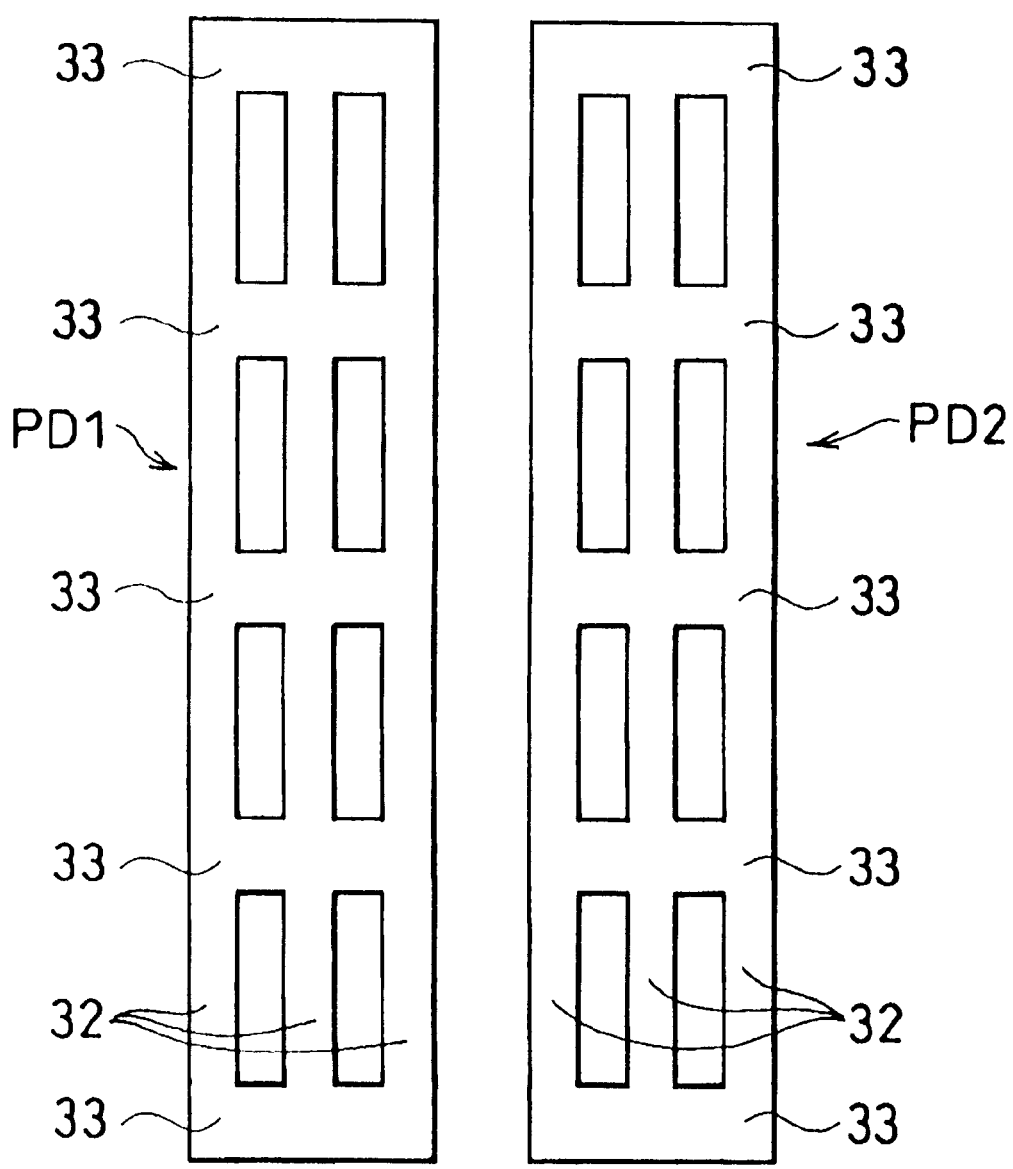

FIG. 6B shows another layout of the light detectors PD1 and PD2 according to the embodying mode. As similar to FIG. 5B, in this layout, the connecting portions 33 are disposed at both end points of each the stripe-patterned portions 32.

Embodying Mode 4

Figure 7:
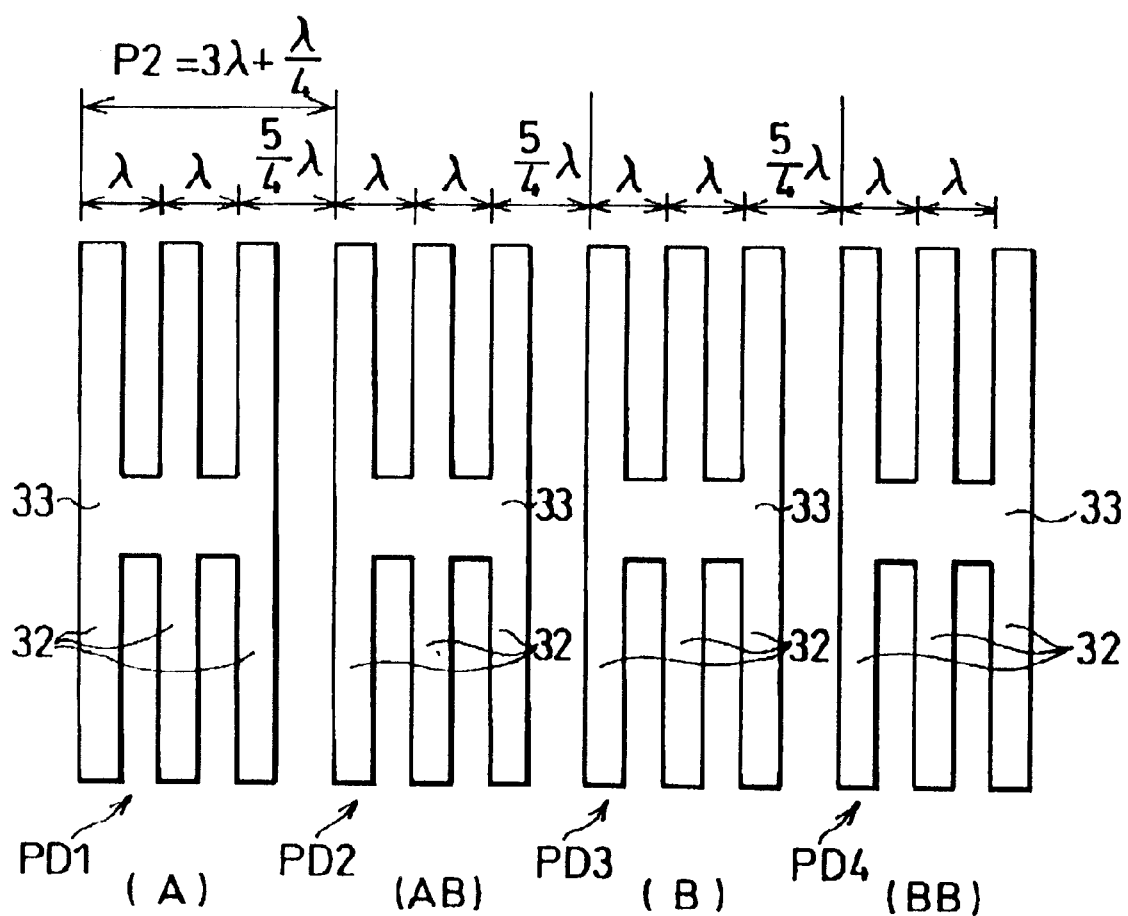
FIG. 7 shows a layout of a light detector array according to another embodiment.

In the above-described embodying modes 1 to 3, it is explained on such a case that dual-phase displacement signals can be obtained. However, the present invention can be applied to such encoders that output four-phase displacement signals. FIG. 7 shows a layout of the light detectors PD1 to PD4 that output four-phase displacement signals.

In this embodying mode, four light detectors PD1 to PD4 are arrayed along the measurement axis x at a pitch of $P2=3\lambda+\lambda/4$. Based on this arrangement, A-, AB-, B- and BB-phase displacement output signals, that are 90° phase-shifted from each other, can be obtained.

As above-described in the embodying mode of FIG. 3, it should be appreciated that at least two stripe-patterned portions are prepared in one light detector. In this embodying mode, when the space between the neighboring light detectors is set to $(2M-1)\lambda/4$ (where, M is a positive integer), the light detectors PD1 to PD4 are arranged at a pitch of $P2=\{n+(2M-1)/4\}\lambda$.

According to this embodying mode, the same advantageous effects can be obtained as described in the above-described embodying modes. With respect to the layout of the light detectors PD1 to PD4, the same manner as that of FIGS. 5A, 5B, 6A or 6B can be applied to this embodying mode. Although 1 set of four light detectors PD1 to PD4 is shown in FIG. 7, a plurality of sets of light detectors can be used in general.

Embodying Mode 5

Figure 8:
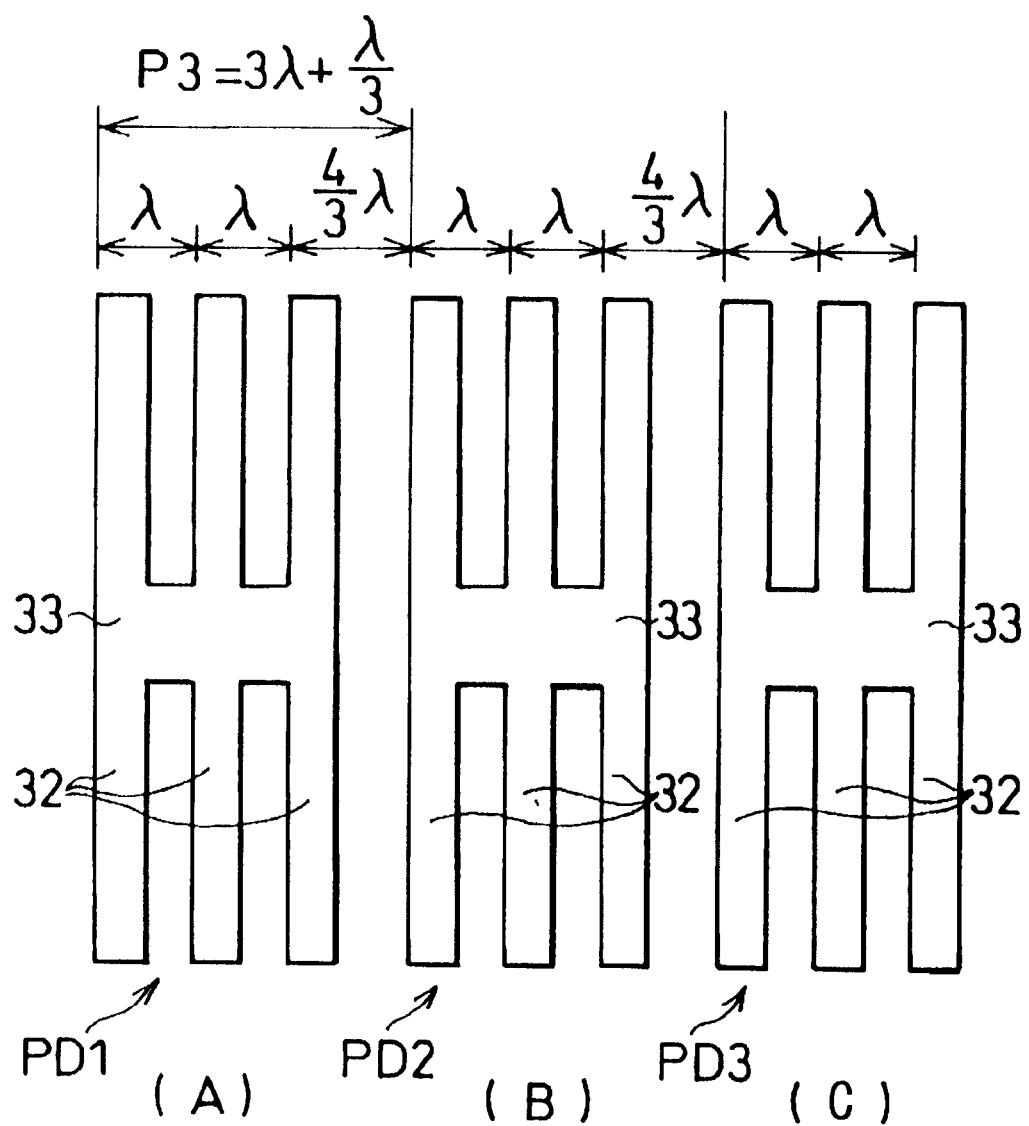
FIG. 8 shows a layout of a light detector array according to another embodiment.

FIG. 8 shows a layout of the light detectors PD1 to PD3 that output three-phase displacement signals. In this embodying mode, three light detectors PD1 to PD3 are arrayed along the measurement axis x at a pitch of $P3=3\lambda+2\lambda/3$. Based on this arrangement, A-, B-, and C-phase displacement output signals, that are 120° phase-shifted from each other, can be obtained.

As above-described in the embodying mode of FIG. 3, it should be appreciated that at least two stripe-patterned portions should are prepared in one light detector. In this embodying mode, when the space between the neighboring light detectors is set to $N\lambda/3$ (where, N is a positive integer except multiple of 3), the light detectors PD1 to PD3 are arranged at a pitch of $P3=(n+N/3)\lambda$.

According to this embodying mode, the same advantageous effects can be obtained as described in the above-described embodying modes. With respect to the layout of the light detectors PD1 to PD3, the same manner as that of FIG. 5A, 5B, 6A or 6B can be applied to this embodying mode. Although 1 set of four light detectors PD1 to PD3 is shown in FIG. 8, a plurality of sets of light detectors can be used in general.

In the above-described embodying modes, the light detectors are formed of amorphous silicon. However, the present invention can be applied to another encoder that has light detectors formed of not an amorphous silicon layer, but a single crystal silicon substrate.

Embodying Mode 6

Figure 9:
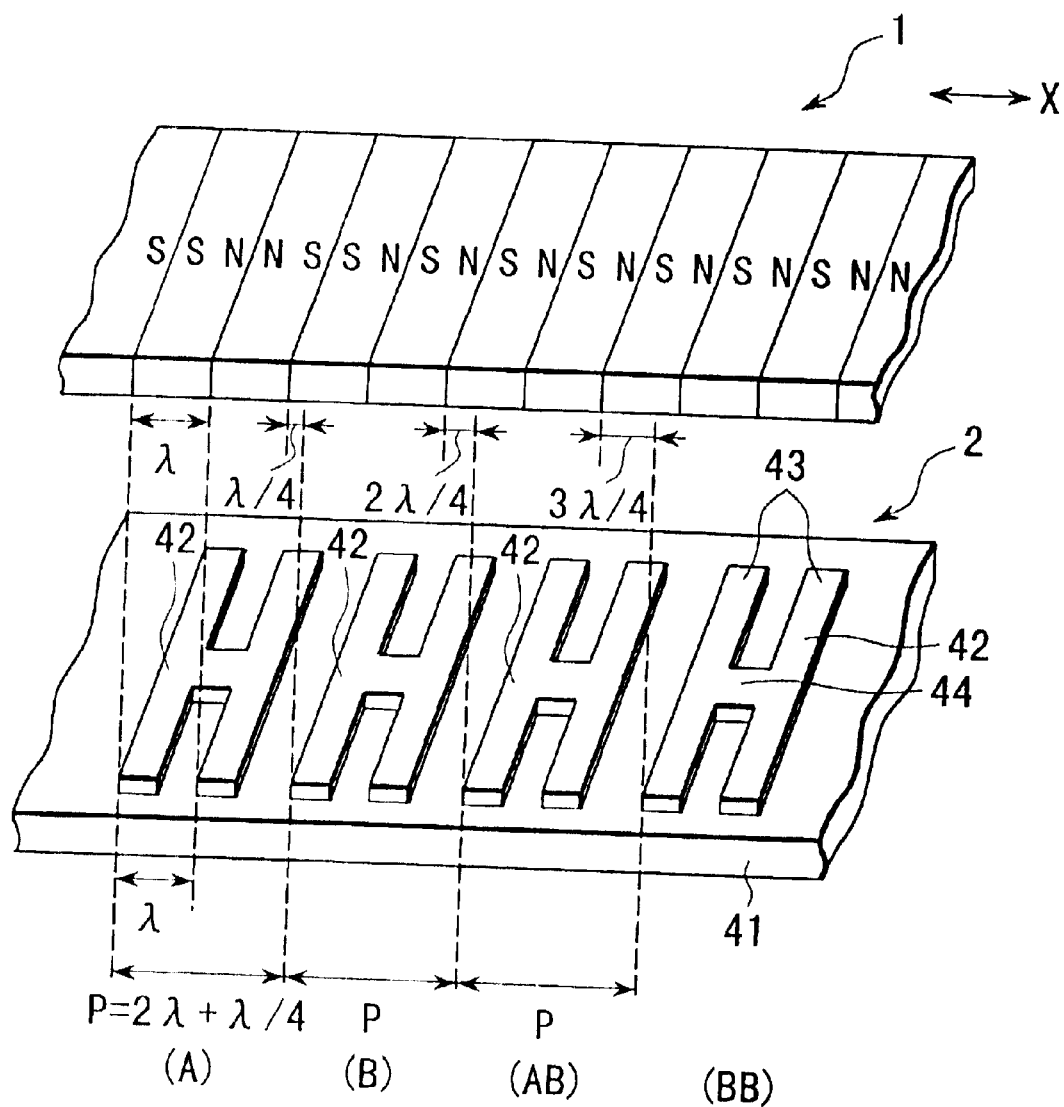
FIG. 9 shows a magnetic encoder according to another embodiment.

FIG. 9 shows a magnetic encoder according to another embodying mode of the present invention. This encoder has, as similar to the above-described embodying modes, a scale 1 and a sensor head 2 disposed against the scale 1 to be relatively movable along the measurement axis x. The scale 1 has a magnetic scale grating, on which N-poles and P-poles are alternately arranged at a pitch equal to $\lambda$ to generate a periodic magnetic field. The sensor head 2 has magnetoresistive devices 42 arranged on a substrate 41 to serve as receiving devices.

Each of the magnetoresistive devices 42 has plural stripe-patterned portions 43 (two stripe-patterned portions 43 in the case of FIG. 9) that are arranged at the pitch of $\lambda$ and connecting portion 44 interconnecting the stripe-patterned portions 43. The respective four magnetoresistive devices 42 are arranged at a pitch of $P=2\lambda+\lambda/4$ to serve as 1 set of the receiving devices which output 4-phase displacement signals, A-, B-, AB- and BB-phases. The space between the stripe-patterned portions 43 in one magnetoresistive device 42 may be generally set to $n\lambda$ (where, n is a positive integer).

In this embodying mode, since the magnetoresistive devices having different phases have been rearranged for miniaturizing the scale pitch as similar to the above-described embodying modes, the same advantageous effects can be obtained as the above-described embodying modes.

It is well known that another type of magnetic encoder which detects not a static magnetic field, but an induced magnetic field generated from the scale. The present invention can also be applied to such magnetic encoders.

Embodying Mode 7

Figure 10:
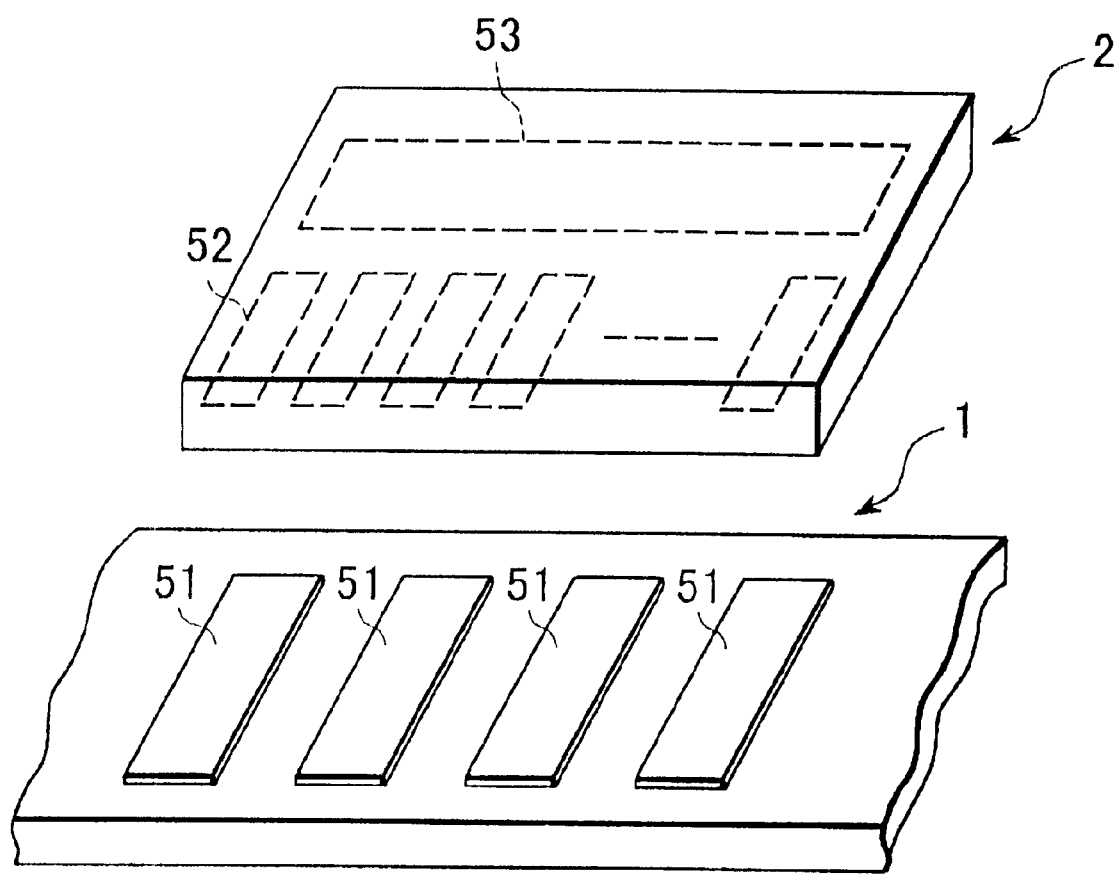
FIG. 10 shows a capacitance-type encoder according to another embodiment.

FIG. 10 shows a capacitance-type encoder according to another embodying mode of the present invention. This encoder has, as similar to the above-described embodying modes, a scale 1 and a sensor head 2 disposed against the scale 1 to be relatively movable along the measurement axis x. On the scale 1, transferring electrodes 51 are arranged at a predetermined pitch along the measurement axis x as a scale grating. The sensor head 2 has transmitting electrode 53 and a receiving electrode array 52 both of which are capacitively coupled to the transferring electrodes 51 on the scale 1.

Figure 11A:
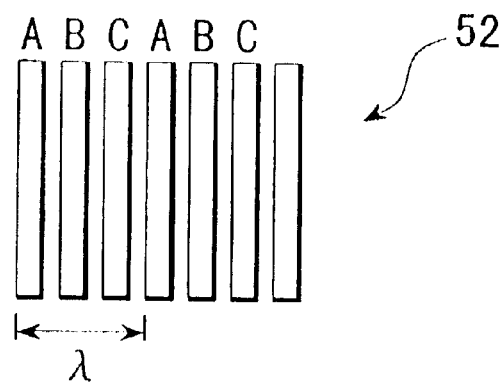
FIGS. 11A to 11C show transmitting electrode layout of the prior art and the embodiment, respectively.

In the conventional type, the receiving electrode array 52 is formed such as shown in FIG. 11A that three-phase receiving electrodes (i.e., A-, B- and C-phase) are arranged at a pitch of $\lambda/3$.

Figure 11B:
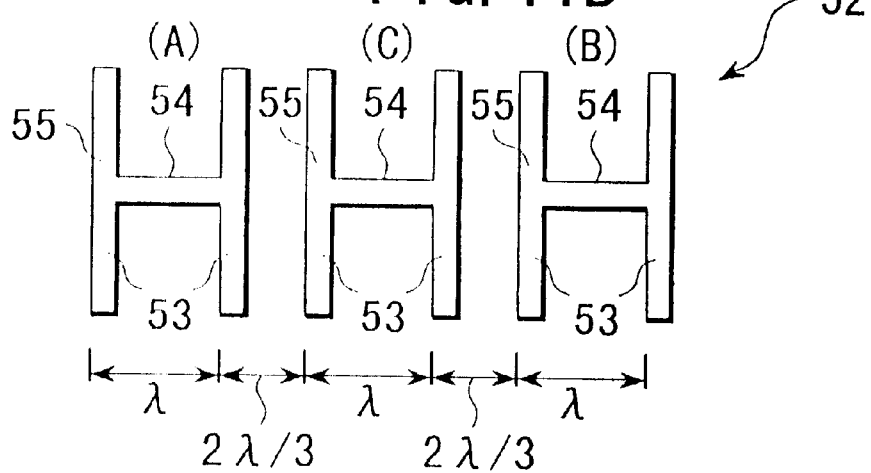
Figure 11C:
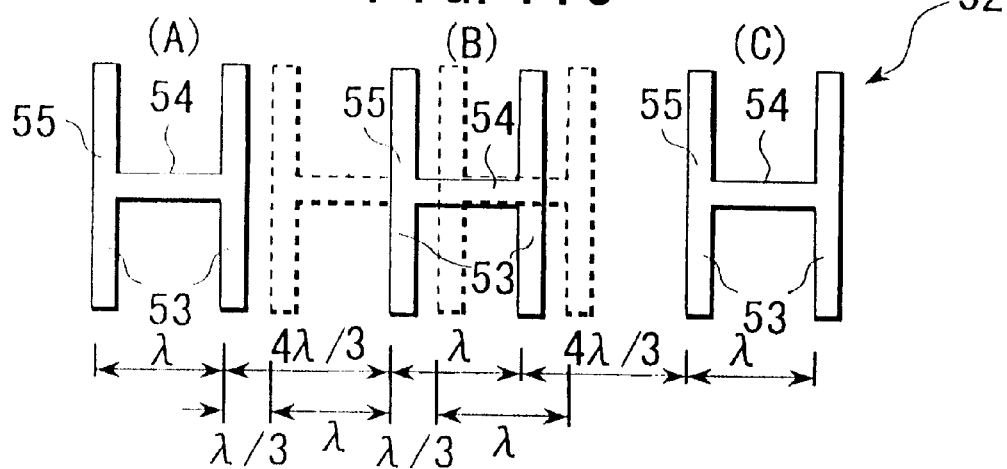

By contrast, in this embodying mode, the receiving electrode array 52 is formed as shown in FIG. 11B. That is, in the receiving electrode array 52, each two electrodes of the same phase are integrally formed into one receiving electrode 55. The receiving electrodes 55 are arranged at a pitch of $\lambda+2\lambda/3$ to serve as A-, C- and B-phase receiving electrodes. As similar to the light detector in the embodying mode 1, each of the receiving electrodes 55 has stripe-patterned portions 53 arranged at the pitch of $\lambda$ and connecting portion 54 interconnecting the stripe-patterned portions 53. Alternatively, the receiving electrodes 55 are arranged, as shown in FIG. 11C, at a pitch of $\lambda+4\lambda/3$ to serve as A-, B- and C-phase receiving electrodes. Further, as shown in FIG. 11C by dotted line, the receiving electrodes 55 may be arranged at a pitch of $\lambda+\lambda/3$ to serve as A-, B- and C-phase receiving electrodes.

Figure 12A:
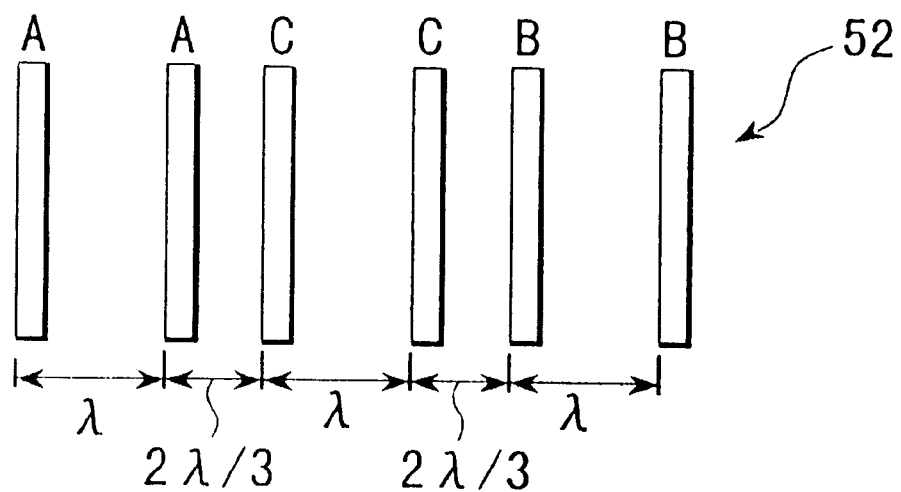
FIGS. 12A and 12B show transmitting electrode layout of the prior art and one embodiment, respectively.
Figure 12B:
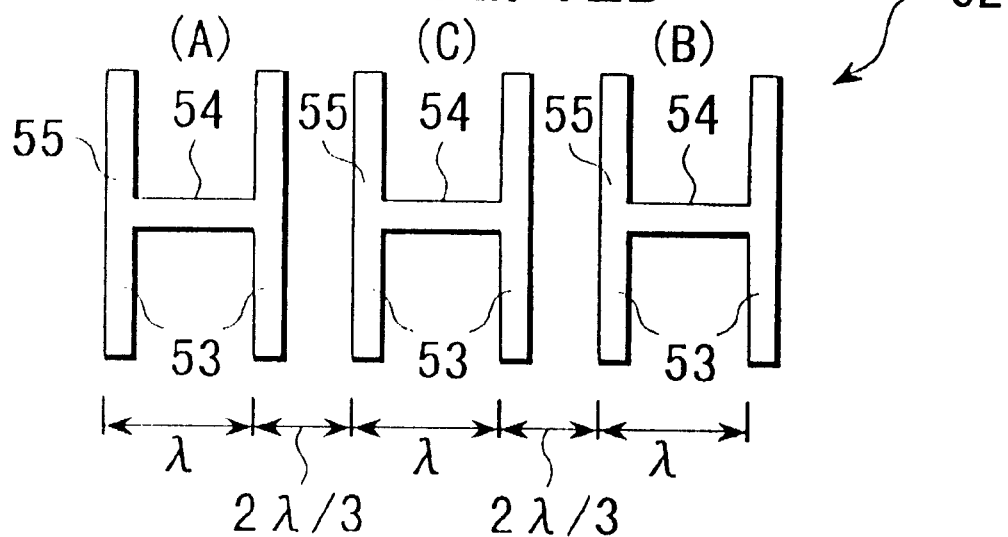

The receiving electrode array of FIG. 11A may be rearranged, as shown in FIG. 12A, such that two receiving electrodes with the same phase are disposed adjacent. In this case, two receiving electrodes with the same phase may be integrally formed into one receiving electrode 55 that has stripe-patterned portions 55 and the connecting portion 54, as shown in FIG. 12B. The receiving electrode array of FIG. 12B is the same as that of FIG. 11B.

In this embodying mode, since the receiving devices having different phases have been rearranged for miniaturizing the scale pitch as similar to the above-described embodying modes, the same advantageous effects can be obtained as the above-described embodying modes.

Comparing the case of FIG. 11B or FIG. 12B in which the receiving electrodes 55 are arranged at the interval of $\lambda/3$ with the case of FIG. 11C in which the receiving electrodes 55 are arranged at the interval of $4\lambda/3$ as shown by solid line, the former has a larger averaging effect than that of the latter, while the receiving device area for one set of the latter can be more miniaturized than that of the former.

The encoder of the embodying mode of FIGS. 11B and 11C output displacement signals with three-phases that are 120° shifted from each other. As similar to the above-described embodying mode, the present invention can be applied to another capacitance-type encoder which outputs dual-phase displacement signals that are 180° phase-shifted from each other, or four-phase displacement signals that are 90° phase-shifted from each other.

What is claimed is:

1. A displacement measuring apparatus, comprising: a scale on which a scale grating is formed along a measurement axis to have a grating pitch of $\lambda$; and a receiving device array disposed against the scale to be relatively movable along the measurement axis, which detect the scale grating to output a plurality of displacement signals having different phases from each other, wherein the receiving device array comprises, a substrate; and a plurality of receiving devices formed on the substrate to output a plurality of displacement signals having different phases from each other, the plurality of receiving devices each having a plurality of stripe-patterned portions and at least one connecting portion interconnecting the stripe-patterned portions, the stripe-patterned portions being arranged along the measurement axis at a pitch equal to $n\lambda$ (where, n is a positive integer).

2. The displacement measuring apparatus according to claim 1, wherein the scale grating is an optical grating, and the receiving device array is a light detector array on which a plurality of light detectors are formed to serve as the receiving devices.

3. The displacement measuring apparatus according to claim 2, wherein the plurality of the light detectors are arranged along the measurement axis at a pitch equal to $\{n+(2M-1)/2\}\lambda$ (where, n and M are positive integers, respectively) such that each set of two light detectors output displacement signals with reverse phases each other.

4. The displacement measuring apparatus according to claim 2, wherein the plurality of the light detectors are arranged along the measurement axis at a pitch equal to $\{n+(2M-1)/4\}\lambda$ (where, n and M are positive integers, respectively) such that each set of four light detectors output four-phase displacement signals that are 90° phase-shifted from each other.

5. The displacement measuring apparatus according to claim 2, wherein the plurality of the light detectors are arranged along the measurement axis at a pitch equal to $(n+N/3)\lambda$ (where, n is a positive integer, and N is a positive integer except multiple of 3) such that each set of four light detectors output three-phase displacement signals that are 120° phase-shifted from each other.

6. The displacement measuring apparatus according to claim 2, wherein each of the light detectors has a detecting surface continuing from the stripe-patterned portions to the connecting portion, and the connecting portion serves as a contact portion at which a signal wire is made contact with the light detector.

7. The displacement measuring apparatus according to claim 2, wherein each of the light detectors has a plurality of stripe-patterned portions and a connecting portion interconnecting midpoints of the respective stripe-patterned portions.

8. The displacement measuring apparatus according to claim 2, wherein each of the light detectors has a plurality of stripe-patterned portions and connecting portion interconnecting at least one end points of the respective stripe-patterned portions.

9. The displacement measuring apparatus according to claim 2, wherein each of the light detectors has a plurality of stripe-patterned portions and connecting portions interconnecting the stripe-patterned portions at a plurality positions in the respective strip-patterned portions.

10. The displacement measuring apparatus according to claim 1, wherein the scale grating is a magnetic grating which generate a periodic magnetic field with a pitch equal to $\lambda$, and the receiving device array is a magnetic detector array on which a plurality of magnetic detectors are formed to serve as the receiving devices.

11. The displacement measuring apparatus according to claim 1, wherein the scale grating is a transferring electrode which has a plurality of transferring electrodes arranged at a pitch of $\lambda$, and the sensor head has a transmitting electrode and a receiving electrode array serving as the receiving device array, both of which are capacitively coupled to the transferring electrodes, the receiving electrode array having a plurality of receiving electrodes which serve as the receiving devices.

12. The displacement measuring apparatus according to claim 1, wherein the connecting portions of each of the plurality of receiving devices having a light-detecting surface.

13. A displacement measuring apparatus, comprising: a scale on which a scale grating is formed along a measurement axis to have a grating pitch of $\lambda$; and a receiving device array disposed against the scale to be relatively movable along the measurement axis, which detect the scale grating to output a plurality of displacement signals having different phases from each other, wherein the receiving device array comprises, a substrate; and a plurality of receiving devices, the plurality of receiving devices each having a plurality of stripe-patterned portions and at least one connecting portion, the light connecting portion having a light-detecting surface and interconnecting the stripe-patterned portions to output a plurality of displacement signals having different phases from each other, the stripe-patterned portions being arranged along the measurement axis at a pitch equal to $n\lambda$ (where, n is a positive integer).

* * * * *